April 30, 1968 R. L. RILEY 3,381,284

DIGITAL MEMORY TIMING SYSTEM

Filed Nov. 16, 1964 6 Sheets-Sheet 1

INVENTOR
RAY L. RILEY,
BY
Robert Thompson
ATTORNEY.

April 30, 1968 R. L. RILEY 3,381,284

DIGITAL MEMORY TIMING SYSTEM

Filed Nov. 16, 1964 6 Sheets-Sheet 2

April 30, 1968 R. L. RILEY 3,381,284

DIGITAL MEMORY TIMING SYSTEM

Filed Nov. 16, 1964 6 Sheets-Sheet 3

April 30, 1968 R. L. RILEY 3,381,284

DIGITAL MEMORY TIMING SYSTEM

Filed Nov. 16, 1964 6 Sheets-Sheet 5

April 30, 1968 R. L. RILEY 3,381,284

DIGITAL MEMORY TIMING SYSTEM

Filed Nov. 16, 1964 6 Sheets-Sheet 6

United States Patent Office 3,381,284
Patented Apr. 30, 1968

3,381,284

DIGITAL MEMORY TIMING SYSTEM

Ray L. Riley, Los Angeles, Calif., assignor to Hughes Aircraft Company, Culver City, Calif., a corporation of Delaware Filed Nov. 16, 1964, Ser. No. 411,382
18 Claims. (Cl. 340—174.1)

ABSTRACT OF THE DISCLOSURE

A digital circuitry including a rotatable magnetic drum memory, having a timing track, a sector track, and at least one data track. A variable phase shift circuit is coupled to receive clock pulses from the timing track and is responsive to the phase of preface pulses from the data track for periodically shifting the phase of the clock pulses into synchronism or phase with the data pulses on a word-by-word basis.

This invention relates generally to rotating or moving magnetic memories and, more particularly relates to a means and a method for obtaining high storage density in an electronic digital memory by compensating for phase variations between timing pulses and digital data pulses.

One problem in operating high capacity moving or rotating magnetic memories is to obtain a proper timing relationship between the storage data pulses and the clock pulses. This is especially true with transportable or portable data processing systems in which, for example, a magnetic drum is subjected to three axes of acceleration in a vibrating environment. For example a high capacity magnetic drum could have an information density of 1000 bits per inch on data tracks and on timing tracks. Access could be gained to the data tracks by means of a data (read-write) head, while access could be gained to clock pulses on the timing track by a clock pulse head. At the extreme positions, the data head could be positioned on one side of the drum which would be diametrically opposite to the position of the clock pulse head. Thus, if the cylindrical surface of the drum were to be radially displaced $\pm 100$ micro inches relative to the heads by the vibrating environment, the resulting phase variation between the clock pulses and the data pulses would be $\pm 0.4$ of a bit time. As a result, tolerable strobe margins for synchronous operation of the memory would be exceeded.

Accordingly, it is an object of this invention to provide an improved means and a method for allowing the phase of the clock pulse derived from the timing track of a rotating magnetic memory to be adjusted in relation to the timing of certain features of retrieved data signals.

Another object of this invention is to provide an improved means and method for adjusting the phase and synchronism of clock pulses of a magnetic memory prior to the retrieval of each data word.

The above and other objectives of the invention are accomplished by providing a cylindrical storage drum having a magnetizable outer surface which is divided into: a timing track; a sector track; and at least one data track. The surface of the drum is rotated beneath relatively stationary magnetic heads to generate: clock pulses from the timing track; sector identification pulses from the sector track; and digital information pulses from the data track. The data track is divided into a series of discrete sectors, each containing one digital word. Each word is in turn further divided into a series of digital bits including: a plurality of prefaced bits, and information bits.

In operation, the sector bits identify a selected sector which contains a digital word to be read. As the selected sector moves under the data head, the prefaced bits, which can include a series of binary zeros followed by a binary one, are generated and applied to a data read circuit. The data read circuit compares the phase relationship of the clock pulses, generated from the timing track, with the phase relationship of a specific characteristic of the prefaced pulses such as the trailing edge thereof. A phase shift control signal having a fixed relationship to the length of the time delay between the clock pulse and the specific characteristics (trailing edge) of the preface pulse is developed and held in the data amplifier. Thereafter, any time a clock pulse occurs, a phase-shifted clock pulse is generated by the read circuit after the predetermined time delay. As a result, the phase shifted pulses will be in precise synchronism and coincidence or phase with the desired characteristic of the following digital word pulses. At the end of the word, an end-of-word signal is applied to the read circuit releasing the held phase shift control signal and returning the read circuit to its deactivated condition. As a result, the clock pulses will be phase shifted and synchronized on a word-by-word basis.

Other objects, features, and advantages of this invention will become apparent upon reading the following detailed description of two embodiments of the invention and referring to the accompanying drawings in which.

Figure 6A:
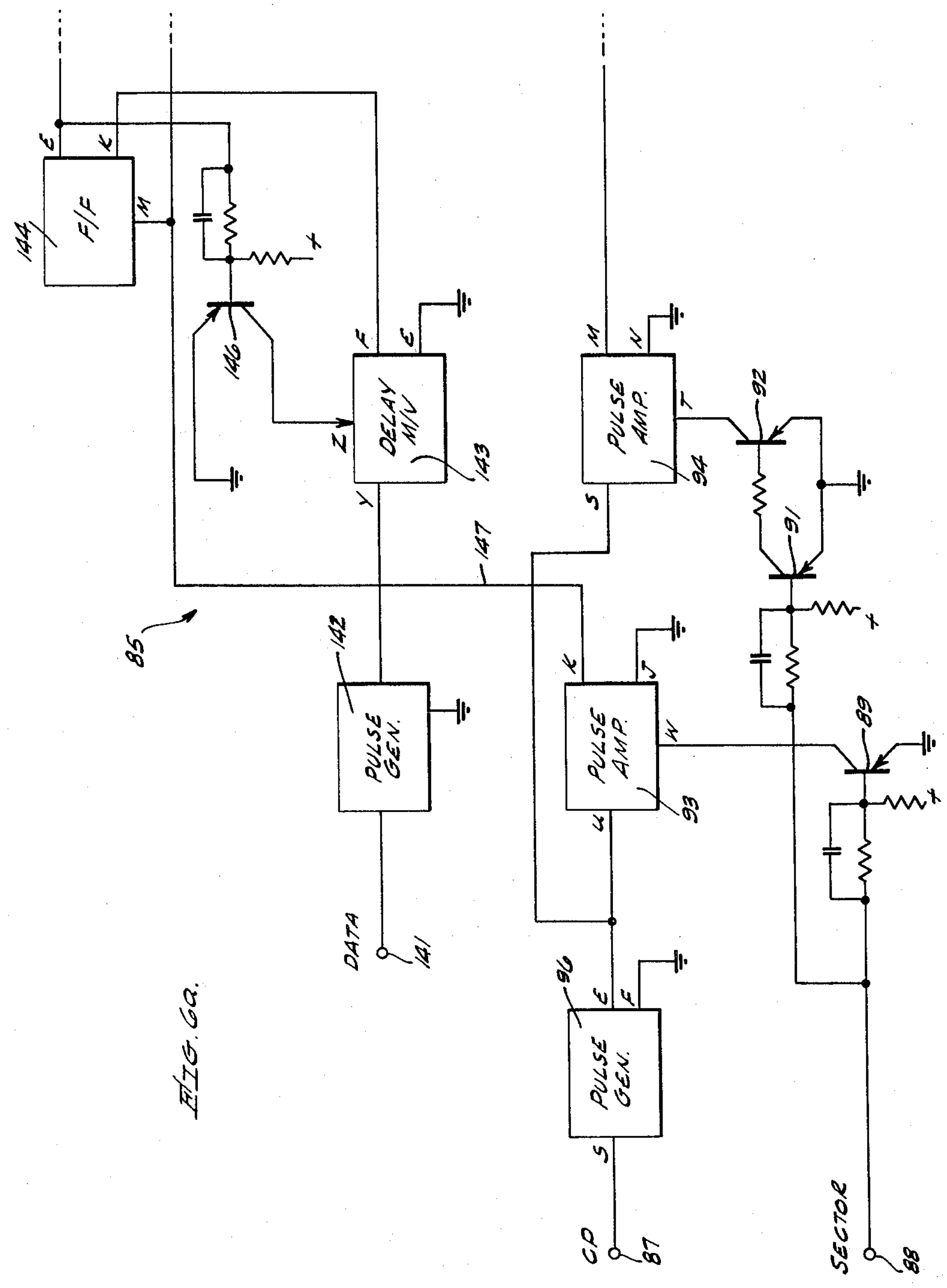
Figure 6B:
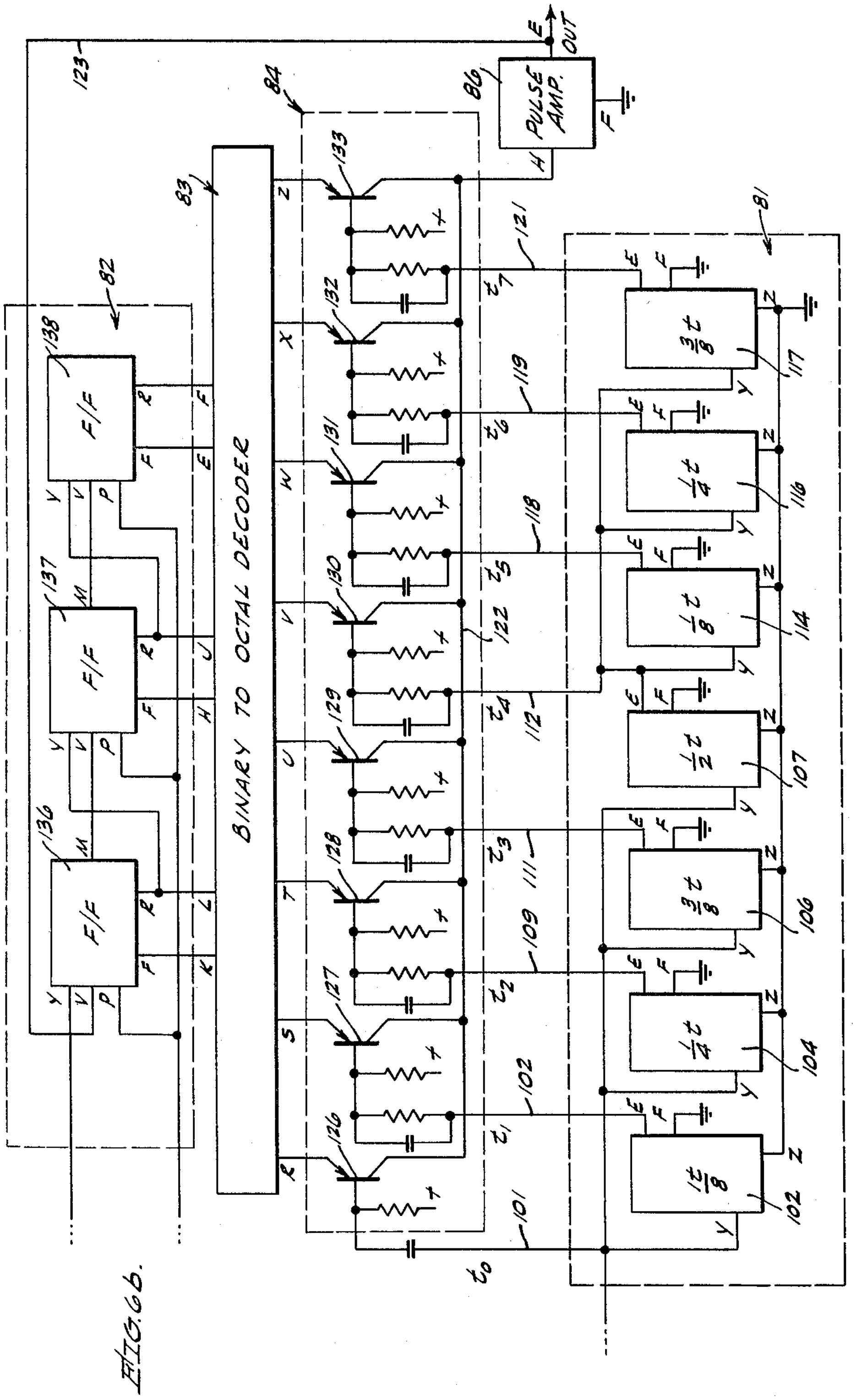
Figure 7:
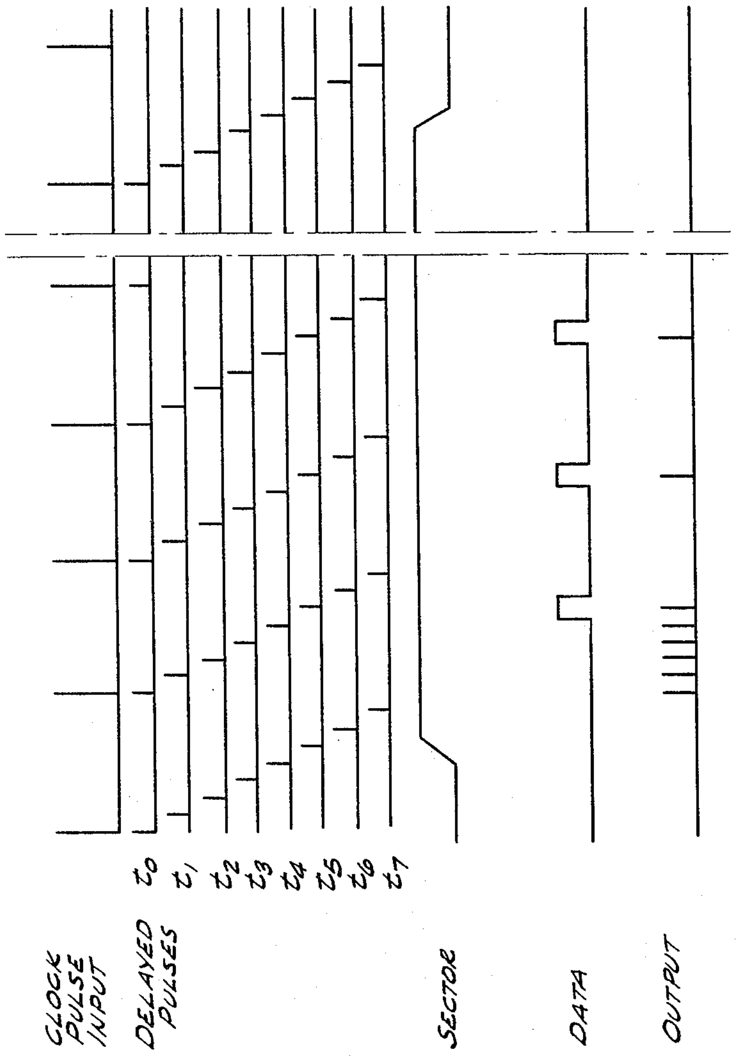

FIGS. 6*a* and 6*b* are in combination a circuit diagram of a preferred second embodiment of the phase shift circuit; and FIG. 7 is a graph illustrating the voltage waveforms that are operationally associated with the phase shift circuit of FIG. 6.

Figure 1:
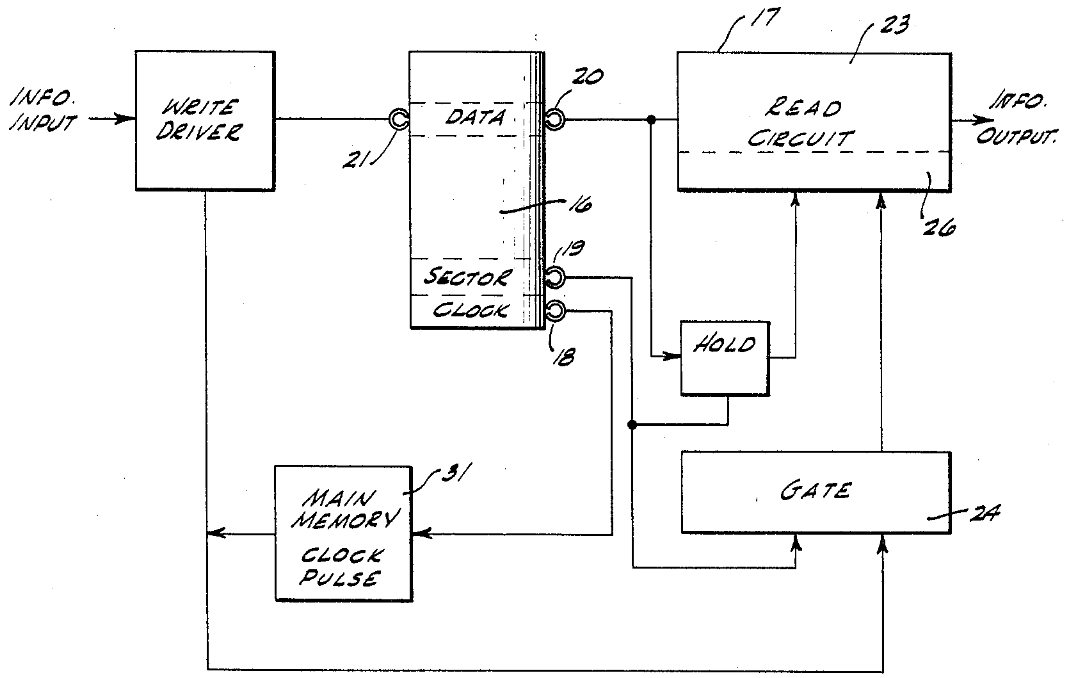
FIG. 1 is a functional block diagram of a digital storage system embodying the features of this invention.

Referring briefly to the digital system, FIG. 1 functionally illustrates a digital processing system having a storage drum 16 which is electrically coupled to a data read circuit 17. Digital pulse signals contained in tracks on the storage drum 16 are transmitted to the data read circuit 17 during select sector times. The data read circuit 17 operably shifts the phase relationship of clock pulses received from a timing track into precise coincidence with the digital data pulses received from a data track of the storage drum. To insure that the phase shift occurs at the beginning of a data word, sector pulse signals from the sector track activate the read circuit as soon as a selected sector moves under the data head, whereupon the read circuit 17 shifts the phase of its clock pulse output into coincidence with the data pulses for the duration of the selected word. At the end of the word, an end-of-word signal deactivates the read circuit 17 until a next word is to be read.

Referring now to the details of the system, the magnetic drum 16 is of the conventional cylindrical type and has a plurality of relatively stationary magnetic heads 18, 19, 20, and 21 positioned about its outer surface. The outer surface of the drum 16 is plated or otherwise covered with a layer of high remanence and high coercivity material such as cobalt-phosphor alloy or cobalt-nickel alloy. The structural details of the magnetic drum can be similar to the Magnetic Memory Drum illustrated in U.S. Patent 2,794,180, issued to N. N. Berger, et al. on May 28, 1957.

As is conventional in electronic digital storage, the surface of the magnetic drum 16 is magnetized into a series of axially spaced, circumferential digital tracks in spaced-apart bands. The individual digital bits are applied to the drum by magnetizing the magnetic surface in small discrete magnetic zones of either a first or a second magnetic polarity. Several conventional ways of doing this are: a nonreturn to zero code or a Manchester code, as will be explained shortly. In operation, the magnetic drum 16 is continuously rotated under the relatively stationary magnetic heads at a constant angular velocity. The magnetic heads 18 through 21 can be the conventional type such as illustrated in U.S. Patent 2,876,437, issued to R. R. Johnson on Mar. 3, 1959. It is necessary that the heads have sufficient resolution to limit the magnetized area to that required for high density storage.

Figure 3:
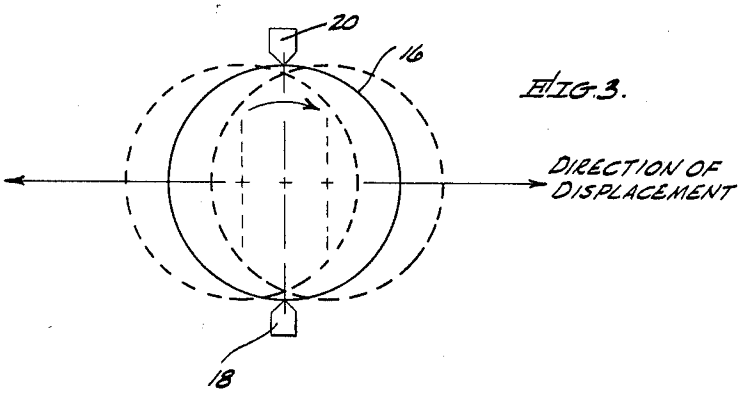
FIG. 3 is a schematic illustration of the drum showing displacement thereof relative to stationary magnetic heads.

A problem with high density digital storage is that a slight radial displacement of the magnetic drum relative to the magnetic heads causes a phase shift between the clock pulses and the data pulses. Assume that the magnetic drum 16 schematically illustrated in FIG. 3 has an outside diameter of 15 inches and a storage density of 1000 bits per inch. Then, if the drum were to be radially displaced a small amount $\pm\Delta$ where $\Delta$ equals 100 micro inches and the clock pulse head 18 and the data head 20 were at diametrically opposite positions relative to the surface of the drum, a phase shift would result between the clock pulses and the data pulses about equal to $\pm 0.4$ of a bit time. In other words, considering the clock pulses to be the reference time, the phase of the data pulses would lead the clock pulses if the magnetic drum were displaced to the right in FIG. 3, and would lag the clock pulses if the magnetic drum were displaced to the left in FIG. 3.

Figure 2:
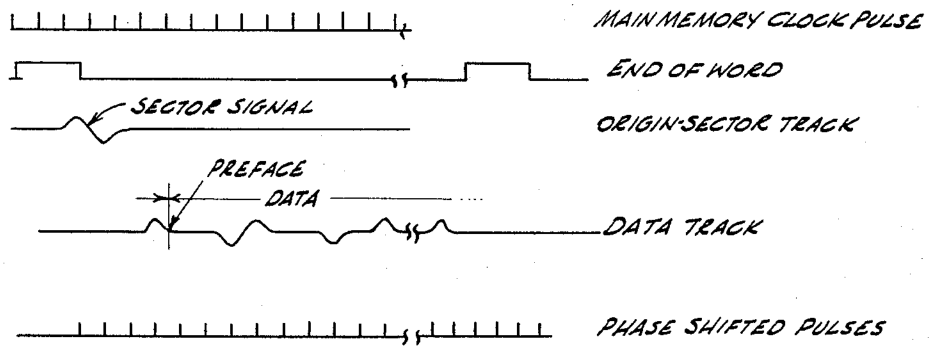
FIG. 2 is a graphical illustration of the signals generated by the digital storage system.

This phase shift problem is overcome by organizing the magnetic drum and its associated circuits in a specific manner so that clock pulses can be generated which are in phase with the digital data bits contained in the data track. This pulse technique is graphically illustrated in FIG. 2 in which a series of clock pulses are continually generated or picked off the timing track drum memory and phase shifted into precise coincidence or phase with the digital word pulses read from the data track. Conventionally, a word is read after the appearance of a selected sector pulse. The digital information on the data track can be recorded in an NRZ code in which each word is preceded by a preface which can be a series of binary zero signals followed by a binary one signal. At any time that there is coincidence between the sector signal and a particular characteristic (for example the trailing edge or peak) of the preface pulses, the data read circuit 17 (FIG. 1) is activated as will be explained in detail shortly, whereupon phase-shifted strobe pulses are generated which are in phase or precise coincidence and synchronism with the data bits of the selected data word. In practice, the data word can be 48 bits long, for example. After a predetermined time interval during which it is expected that all the bits of the word have been read out, an end-of-word pulse is generated in a conventional manner and applied to the data read circuit 17 deactivating it and cutting off the phase-shifted strobe pulses.

The data read circuit includes two parallel channels: a data channel including a read amplifier 23; and a clock pulse and sector selector channel including a phase shift circuit 26. One read amplifier 23 which could be used is described and illustrated in U.S. Patent 3,034,068, issued to J. M. Hansen on May 8, 1962. This read amplifier receives output signals from the data head 20 and amplifies them to a usable level.

The pulse phase shift circuit 26 phase shifts the clock pulses into a correct timing synchronism and phase with the read data information. In operation, it converts the time between a clock pulse and the peak of a data track preface pulse into an analog signal. The analog voltage so developed is a ramp voltage having an instantaneous magnitude which indicates the amount of phase shift required of the clock pulses and which is maintained in a hold circuit. Thereafter, ramp voltages, which are continually generated between clock pulses, are continually compared to the held or storage analog voltage. Upon amplitude coincidence between the two compared voltage signals, a phase shifted strobe or clock pulse is generated.

Figure 4:
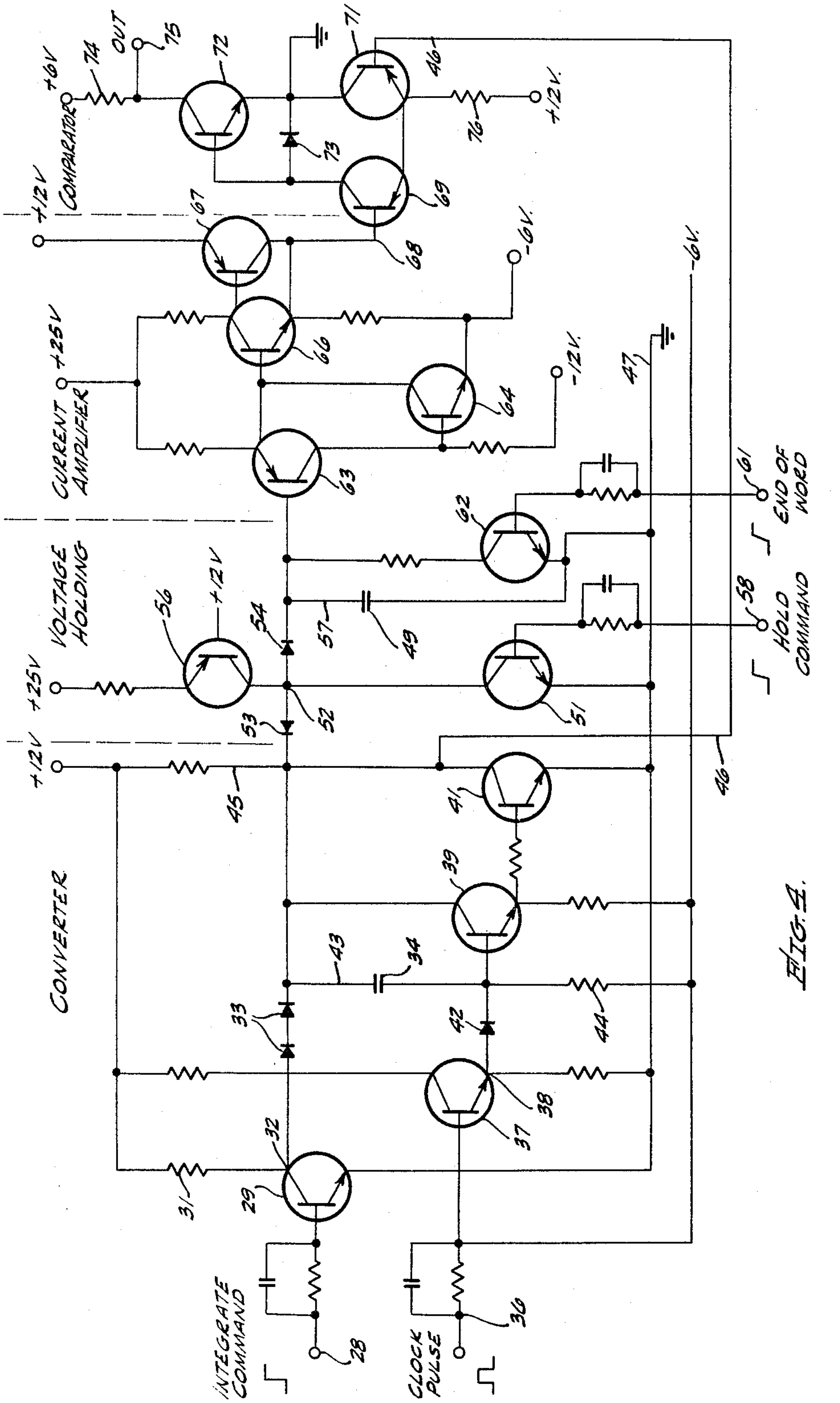
FIG. 4 is a schematic circuit diagram of one embodiment of a phase shift circuit which can be used in FIG. 1.

As illustrated in detail in FIG. 4, the phase shift circuit 26 can be operationally broken down into four basic circuits which are: a pulse phase to analog signal converter, a reference signal holding circuit; a current amplifier; and a voltage comparator circuit.

Figure 5:
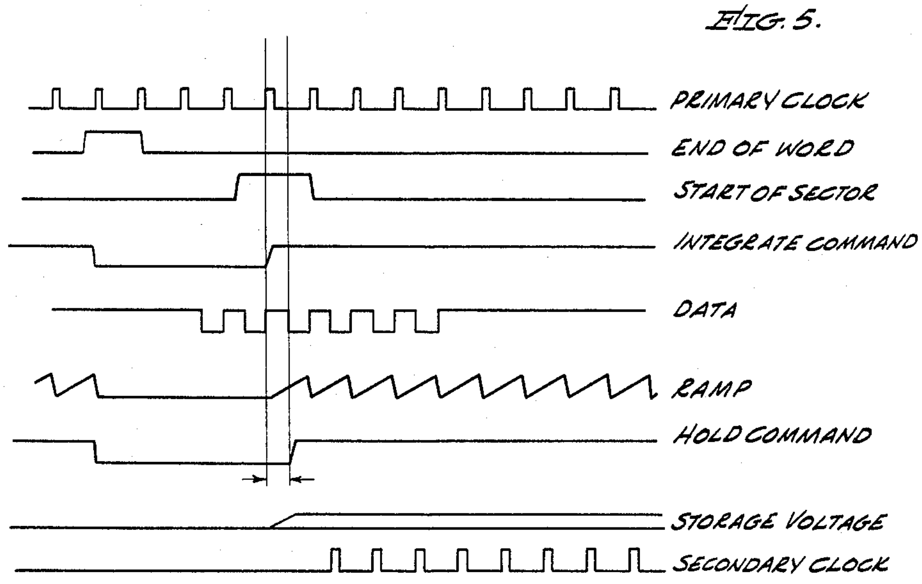
FIG. 5 is a graph illustrating the voltage waveforms that are operably associated with the phase shift circuit of FIG. 4.

In operation, the analog signal converter is an integrator circuit which begins to generate a ramp function signal upon the first coincidence between a specific address sector signal pulse and a primary clock pulse of the types graphically illustrated in FIG. 5. The time base of the pulses in FIG. 5 has been expanded to show a series of square wave clock pulses each having a short duration. These clock pulses can be generated by a clock pulse generator 31 (FIG. 1) which can be of the type illustrated and described in "Pulse and Digital Circuits" by Millman & Taub, published by McGraw-Hill, 1956 on page 468 (FIG. 15–10). These two pulses are applied to a gate circuit 24 such as a conventional bistable multivibrator to develop an integrate command signal having a duration at least equal to the length of the word to be read.

This integrate command signal, shown as a voltage state signal in FIG. 4, is applied to an integrate command input terminal 28 for turning on an integration control transistor 29. With the integration control transistors 29 on, collector current is conducted through a collector resistor 31 decreasing the voltage, relative to ground, at a collector junction 32. As the voltage at the collector junction 32 decreases, two series-connected diodes 33 which are connected between the collector junction 32 and one end of an integrating capacitor 34 are back biased. As will be explained in more detail, once the duration of the clock pulse which has been applied to the clock input terminal 36 ends, the initial integration step starts.

To integrate and generate a ramp voltage as shown graphically in FIG. 5, a clock switch transistor 37 is turned off by the decrease and base-emitter forward bias which occurs at the trailing edge of each clock pulse applied to the clock input terminal 36. As the clock switch transistor 37 is turned off, a voltage decrease occurs at an emitter junction 38. As a result, the base-emitter forward bias to a pair of series-connected integrator discharge transistors 39 and 41 is decreased. With the clock switch transistor 37 now cut off, a diode 42 which is connected between the emitter junction 38 and the integrate capacitor 34 is back biased. Transistors 39 and 41 together with resistor 44 and capacitor 34 operate in somewhat the same manner as the "Miller integrator" circuit described in "Pulse and Digital Circuits" (previously referenced) on page 214. During this circuit condition, current from a line 45 is supplied to integrator capacitor 34 to develop a charge voltage across the integrate capacitor 34 which has a more positive polarity on a lead 43. The charge rate of integrating capacitor 34 is a ramp function (FIG. 5), as determined by the time constant of the integrate capacitor 34 and an integrate resistor 44. One set of circuit parameters which could be used would be an integrator capacitor of 100 mmf. and a resistor 44 of 5K ohms. The increasing ramp voltage is applied to a line 46 where it can be conducted to control a comparator, as will be explained shortly.

With the occurrence of the next clock pulse on the input terminal 36, the clock switch transistor 37 is turned on to increase the voltage at emitter 38, thereby forwardbiasing the diode 42 to increase the base current to the integrator transistors 39 and 41. With the integrator transistor 41 now turned on, the electrical charge from the integrating capacitor 34 is discharged through the collector-emitter of transistor 41 to a ground terminal 47. At the trailing edge of the clock pulse, the transistor 37 and diode 42 are again turned off, whereupon integrator discharge ends. Thereafter, ramp voltages are continually generated in the above described manner during the time interval between each subsequent clock pulse.

During the above described initial integration step, the voltage-holding circuit is also charged to a storage voltage at the same rate as the integration or ramp voltage changes until the occurrence of a specific pulse characteristic (peak) of the data preface pulse. During integration, current is supplied to both the integrating capacitor 34 and a hold capacitor 49 from a current source including a forward-biased transistor 56. The charge rate and resultant instantaneous voltage on the line 43 of the integrator capacitor 34 controls the instantaneous voltage on the hold capacitor 49 which in turn has a large capacitance. This occurs as a result of a current division between the integrator circuit and the hold circuit at a junction 52 between two current control diodes 53 and 54. During an initial charging of the hold capacitor 49, a switch transistor 51 connected to diode junction 52 is turned off, thereby insuring that substantially all of the current will go through the diodes 53 and 54. As the current divides through the diode 53 and the diode 54, the voltage change across the diodes resulting from the charging of the integrate capacitor 34 and the hold capacitor 49 varies the diode forward impedance exponentially in accordance with their forward bias. This diode action thereby insures that the voltage on a lead 57 of the hold capacitor 49 is substantially equal to the voltage on the lead 43 of the integrating capacitor 34.

At the occurrence of a specific characteristic (trailing edge or peak) of a preface pulse detected from the data track during a sector signal duration, a hold command signal having a positive voltage is applied to a hold input terminal 58, thereby turning on the switch transistor 51. With the switch transistor 56 turned on, current from the current source transistor 51 no longer divides through the diodes 53 and 54 but flows to the ground terminal 47 through the collector-emitter terminals of switch transistor 51. As the voltage on the collector terminal of switch transistor 51 drops, the diodes 53 and 54 are back biased preventing further charging and any discharge of the hold capacitor 49 until an end-of-word pulse is generated. It should be understood that the end-of-word pulse can be generated in any conventional way such as by a magnetic area on the storage drum and appropriate logic circuitry. When an end-of-word pulse is applied to an end-of-word input terminal 61, a shunt transistor 62 is forward base biased, thereby creating a path for current discharge to ground of the hold capacitor 49 which is connected in parallel circuit with it. In addition, the hold command pulse to the hold circuit is ended (FIG. 5) and the switch transistor 51 turned off at the end of a word, thereby setting up the hold circuit for a new hold voltage for the next data word. An advantage of this is that a phase shift reference or hold voltage can be obtained on a word-by-word basis.

Prior to the end-of-word pulse, the voltage on the hold capacitor 49 is compared to the voltage of each ramp voltage, whereupon a phase shifted clock pulse signal is generated in coincidence with each data track pulse each time the ramp voltage makes a positive transition relative to the hold or reference voltage on the hold capacitor 49. To accomplish this continual comparison between the hold voltage and the ramp voltage, a current amplifier having a unity gain with a high input impedance and a low voltage change between the input terminal and the output terminal current amplifies the voltage stored on the hold capacitor 49. The base current to transistor 63 from hold capacitor 49 is maintained low by keeping the emitter current to transistor 63 low. To keep the emitter current low, a complementary transistor 64 is connected across the emitter collector terminal of transistor 63 and is forward biased to provide a large current flow. Two output transistors 66 and 67 are directly coupled to provide a low output impedance and high current gain for the current amplifier. The first of these output transistors 66 has a base terminal connected to the junction of the emitter and collector of the transistors 63 and 64, respectively. With this current amplifier, the voltage at the output terminal 68 is substantially the same as the voltage on the hold lead capacitor 57 and is applied to a comparator circuit.

The ramp voltage on line 46 is also applied to the comparator so that the comparator generates a clock pulse initiate signal which is in synchronism or phase with the characteristic (trailing edge) of the data pulse that actuated the hold circuit. In operation, the hold voltage on line 68 is applied to the base terminal of a transistor 69 while the integrator ramp voltage on line 46 is continually applied to the base terminal of a transistor 71. When the ramp voltage on line 46 makes a positive transition relative to the hold voltage on line 68, current flowing in resistor 76 is diverted from the emitter-collector of transistor 71 to the emitter-collector of transistor 69. This results in the output transistor 72 being quickly turned on, thereby quickly increasing the collector current through the output resistor 74 causing the voltage on the output terminal 75 to fall quickly. Thereafter, this fast fall time signal on the output terminal 75 can be used to generate a phase shifted clock pulse that has the same frequency as the primary clock pulse but has been phase shifted into coincidence with the data pulses in the data channel. One circuit that could be used to generate the phase shifted clock pulses is the previously referenced clock pulse generator. The resultant phase shifted clock pulse could be set to have the same duration as the clock pulse generated from the timing track of the magnetic drum.

The read amplifier 23 in the data channel (FIG. 1) has an output stage gate which receives the phase shifted clock pulse for generating an output signal which in turn can be used to switch a conventional monostable multivibrator (not shown).

In a second embodiment, a pulse phase shift circuit illustrated in FIG. 6 can be used in place of the phase shift circuit 26 illustrated in FIG. 4. As in the preceding embodiment, the circuit of FIG. 6 phase shifts the clock pulses into correct timing synchronism with the read data pulse information. In operation, the circuit converts the time relationship between a clock pulse and the peak of a data track preface pulse into a digital signal. The clock pulse is converted into a series of delayed pulses each equally spaced a fractional increment of the clock pulse spacing. The count of the delayed pulses is stored or held in a counter upon occurrence of the predetermined feature of the data track pulse. Thereafter, each subsequent clock pulse initiates the series of delayed pulses whereupon the delayed pulses are compared to the stored count. Upon coincidence of the subsequent delayed pulse count that corresponds to the held pulse count, a phase shifted strobe or clock pulse is generated.

The phase shift circuit illustrated in FIGS. 6*a* and 6*b* can be operationally broken down into the following basic circuits: a tapped delay line 81 for generating a series of delayed pulses $t_0$–$t_7$; a binary counter 82 for storing the count of the delayed pulses $t_0$–$t_7$ at the time of coincidence with a data pulse from the data track; a binary decoder 83 for decoding the binary count; a pulse comparator gate 84 connected to have only one stage energized at any one time by the output of the decoder 83; a pulse amplifier 86 connected in common with the comparator gate stages whereupon when the pulse comparator gate 84 generates pulse signals to actuate the pulse amplifier 86 at each subsequent delayed pulse the amplified output pulses are led back to the counter 86 to change the count; and a control circuit 85 which is responsive to the data track pulses for inhibiting the counter 82 at the occurrence of the first data pulse in a sector and clearing the counter of the last respective data pulse in a sector.

In operation, delay line 81 generates a series of delayed pulses $t_0$–$t_7$ when a clock pulse is applied to an input terminal 87 during a time period when a positive sector signal (relative to a quiescent level) is applied to an input terminal 88. When the sector signal (FIG. 7) is applied to the input terminal 88 an inverter transistor 89 and inverter transistors 91, 92 are turned on to gate and ungate pulse amplifiers 93 and 94, respectively, for conduction of the clock pulse applied to input terminal 87. The clock pulse which is applied to terminal 87 actuates a pulse generator 96, which can be a Schmitt circuit, producing a square wave, short-duration, pulse on an output terminal E. One conventional and commercially available pulse generator that could be used is described and illustrated in the book Digital Modules, published by Digital Equipment Corporation, Maynard, Mass., copyright 1962, p. 141, "Module No. 1410." For purposes of simplifying the drawings and description, the terminal reference characters are consistent with the reference letters for circuit connections used in the above-referenced book and are used on the drawings merely for the purpose of enabling a person skilled in the art to reconstruct the disclosed structure.

The pulse output from the output terminal E of the pulse generator 96 is applied to the input terminal V of the pulse amplifier 93 and to input terminal S of pulse amplifier 94 where it is amplified and appears on output terminals K and M, respectively. The amplified pulse appearing on output terminal M of the pulse amplifier 94 is applied to the tapped delay line 81 to generate the series of delayed pulses $t_0$–$t_7$. Referring back to pulse amplifier 93, no counter reset signal is generated on the output terminal K during the time that the inverter 89 is nonconducting. One conventional commercially available circuit that could be used for both of the pulse amplifiers 93 and 94 is illustrated and described on page 175 of the above-referenced Digital Modules book and identified as "Module No. 1607."

The amplified output pulse which is applied to the tapped delay line 81 generates a series of delayed pulses $t_0$–$t_7$ (FIG. 7) during the spacing between adjacent clock pulses. The first pulse $t_0$, which is not delayed, is applied directly to a conductor 101 from the output terminal N of the pulse amplifier 94.

In addition, a first delay element 102 is energized by the output pulse from the pulse amplifier 94 to generate a time delay pulse $t_1$ on output terminal E and a conductor 103 after a preset time delay of ⅛ of the spacing between adjacent clock pulses. One conventional delay element that could be used is an adjustable monostable multivibrator which is described and illustrated in the above-referenced Digital Modules book, on page 135 and identified as "Module No. 1304."

The amplified output pulse from the pulse amplifier 94 is also applied to the Y input terminal of each delay element 104, 106, and 107, respectively. The delay element 104 generates a delayed pulse $t_2$ on its output terminal E which is delayed ¼ of the spacing between adjacent clock pulses. The delayed pulse $t_3$ on the output terminal E of delay element 106 is in turn delayed ⅜ of the spacing between clock pulses while the output pulse $t_4$ on terminal E of the delay element 107 is delayed ½ of the pulse spacing between clock pulses.

The delayed pulse $t_4$ is also applied to an input terminal Y of delay elements 114, 116, and 117 which further delay the pulse $t_4$ ⅛, ¼, and ⅜ of the spacing between adjacent clock pulses. As a result, the respective output pulses $t_5$, $t_6$ and $t_7$ are delayed a total spacing of ⅝ of the time interval between clock pulses, ¾ of the time interval between clock pulses, and ⅞ of the time interval between clock pulses, respectively. It should of course be understood that all of the delay elements can be of the same type referenced for the delay elements 102.

The delayed pulses $t_0$–$t_7$ are sequentially applied to the pulse comparator gate 84 to initially generate a series of pulses on a common collector line 122 which are applied to an input terminal H of the pulse amplifier 86 to generate a series of amplified pulses on a feedback conductor 123 to the binary counter 82. The pulse comparator gate 84 includes eight parallel connected transistors 126–133 which receive the delayed pulses $t_0$–$t_7$, respectively, on their base terminals. The emitter terminal of the transistors 126–133 are connected to the binary-to-octal decoder 83 which determines which one of the transistors shall conduct current when a pulse signal is applied to its base terminal. In operation, the binary count on the counter 82 selectively energizes one of the decoder output terminals R–Z. For example, a binary count of 000 would energize the R terminal of decoder 83. Whereas, a binary count of 001 would energize the output terminal S of the decoder 83, etc. One type of binary-to-octal decoder that could be used is described and illustrated on page 125 of the above-referenced Digital Modules book and is identified as "Module No. 1151."

In operation, the binary counter 82 is initially set to a binary 000 count thereby energizing the output terminal R of the binary-to-octal decoder 83. As the pulse $t_0$ is applied to the base terminal of first transistor 126, the transistor conducts, thereby generating a pulse signal on the common emitter line 122. The pulse signal on the common emitter line 122 is applied to the pulse amplifier 86. The pulse amplifier 86 in turn generates an output pulse on the output terminal E. This output pulse is applied to feedback conductor 123 and to an input terminal V of a first stage flip flop 136 of the binary counter 82 to switch its output from a binary 0 on an output terminal F to a binary 1 on an output terminal R of flip flop 136. This energizes the output terminal S of the decoder 83.

With the output terminal S of the decoder 83 on, the next delayed pulse $t_1$, which is applied to the base of a gate transistor 127 over the conductor 103 causes the transistor 127 to conduct and a pulse signal to appear on the common emitter line 122. This pulse signal is also amplified by pulse amplifier 86 and fed back to the counter over the feedback conductor 123. When the first stage counter flop flop 136 receives the fedback delay pulse $t_1$ on its input terminal V, the flip flop 136 changes back to a binary 0 state with an output on terminal F. At this time the signals from output terminals R and M of flip flop 136 generate a carry signal to change the state of the second stage counter flip flop 137 to a binary 1, thereby creating a binary count of 010. With this binary count an output terminal T of the decoder 83 is energized, thereby enabling a gate transistor 128 to generate a pulse on the common emitter line 122 when the next delayed pulse $t_2$ is received over the conductor 107. Thereafter, this sequence of amplifying the pulse with pulse amplifier 86 and feeding the amplified pulse back to the counter 82 over the feedback line 123 is continued until a coincidence occurs between a data pulse applied to an input terminal 141 of the phase shift circuit.

When a data pulse is received on the input terminal 141 the binary counter 82 is inhibited so that the binary count, which is on the counter at the time of the data pulse is received, is stored or held, thereby maintaining a select one of the transistor gates 126–133 energized. As a result, only that delayed pulse $t_n$ of $t_0$–$t_7$ that is in synchronism or phase with the data pulse will generate a pulse on the common emitter line 122. And, as a result, another phase shifted clock pulse $t_n$ that is in synchronism with the data pulse will be amplified by the pulse amplifier 86.

Referring now to the details of this counter hold operation, a data pulse which is applied to the input terminal 141 is applied to an input terminal S of a pulse generator 142. The pulse generator 142 can be a Schmitt trigger type similar to the previously referenced pulse generator 96 and generates a square pulse at its output terminal E. This output pulse is applied to an input terminal Y of a delay unit 143 which can be a monostable multivibrator of the type referenced for delay element 102. By using this delay unit 143, the inherent delays in each element of the previously described clock pulse channel are compensated for to provide proper timing relationship between the data pulse that inhibits the binary counter 82 and the delayed pulses $t_0$–$t_7$ which fill the binary counter.

The square wave output pulse on output terminal F of the delay unit 143 is applied to an input terminal K of a control flip flop 144. When this happens the control flip flop 144 is enabled to generate an inhibit pulse on its output terminal E which is then applied to an input terminal Y of the first stage flip flop 136 to inhibit the binary counter 82. In addition, the inhibit pulse is also applied to the base of an inverter transistor 146, thereby develops a signal on the collector terminal which is applied to an input terminal Z of the delay unit 143 to turn off the delay unit 143 and prevent further transmission of data pulses until the end of a digital word or sector.

At the end of a digital word, the sector signal on input terminal 88 again goes negative to turn on the inverter transistor 89 and the transistor 91 which in turn turns off transistor 92 to generate a counter clear pulse on output terminal K of the pulse amplifier 93, and to inhibit any clock pulse output on the output terminal M of the pulse amplifier 94, respectively. When the counter reset pulse is conducted on conductor 147, the control flip flop 144 is reset to its initial state, thereby enabling both the binary counter 82 and the delay unit 143. In addition, the counter reset pulse on conductor 147 is applied to the input terminals P of each binary counter stage 136, 137 and 138 to clear the stored count, whereupon, the counter is reset to a binary 000 count.

Thereafter, the above-described sequence and operation can be initiated when the next relatively negative sector signal is received on terminal 88.

While the salient features have been illustrated and described with respect to particular embodiments, it should be readily apparent that modifications can be made within the spirit and scope of the invention, and it is therefore not desired to limit the invention to the exact details shown and described.

What is claimed is:

1. In an electronic digital system of the type including a rotatable magnetic memory having a timing track and at least one data track, a digital pulse read circuit comprising: a gated data channel connected to receive and selectively conduct pulse signals from the data track; and a clock pulse channel connected to receive pulses from the timing track, said clock pulse channel including a variable phase shift circuit responsive to the phase of the data track pulses for periodically shifting the clock pulses into synchronism with the data track pulses, said gated data channel being coupled to receive the phase shifted clock pulse to enable conduction of the pulses through said gated data channel.

2. In an electronic digital system of the type including a rotatable magnetic memory having a timing track, a sector track, and at least one data track, a digital pulse read circuit comprising: a gated data channel connected to receive and selectively conduct pulse signals from the data track, and a clock pulse channel responsive to a sector signal and connected to receive pulses from the timing track during a predetermined sector signal, said clock pulse channel including a variable phase shift circuit responsive to the phase of the data track pulses for phase shifting the clock pulses into synchronism with the data track pulses at the beginning of each sector signal, said gated data channel being coupled to receive the phase shifted clock pulse to enable conduction of the pulses through said gated data channel.

3. In an electronic digital system of the type including a rotatable magnetic memory having a timing track, a sector track, and at least one data track, a digital pulse read circuit comprising: a gated data channel connected to receive and selectively conduct pulse signals from the data track; and a clock pulse channel responsive to a sector signal and connected to receive pulses from the timing track during a predetermined sector signal, said clock pulse channel including a variable phase shift circuit responsive to the phase of the data track pulses for phase shifting the clock pulses into synchronism with the data track pulses at the first data track pulse that occurs during each sector signal, said gated data channel being coupled to receive the phase shifted clock pulse to enable conduction of the pulses through said gated data channel.

4. In an electronic digital system of the type including a rotatable magnetic memory having a timing track, a sector track, and at least one data track, a digital pulse read circuit comprising: a gated data channel connected to receive and selectively conduct pulse signals from the data track; and a clock pulse channel responsive to a sector signal and connected to receive pulses from the timing track during a predetermined sector signal, said clock pulse channel including a variable phase shift circuit responsive to the phase of the data track pulses for phase shifting the clock pulses into synchronism with the data track pulses at the first data track pulse occurrence within the period of each sector signal, and for resetting the phase shift circuit at the first data track occurrence within each subsequent sector signal, said gated data channel being coupled to receive the phase shifted clock pulse for strobing the data pulses in said gated data track.

5. In an electronic digital system of the type including a rotatable magnetic memory having a timing track and at least one data track, a digital pulse read circuit comprising: a converter circuit connected to continually receive pulse information from the timing track of the memory drum for continually generating reference signals between each timing pulse; a hold circuit responsive to the data track pulses being connected for receiving and holding the instantaneous reference signal as a hold signal at the occurrence of a specific characteristic of a data track pulse; and signal comparing means responsive to the hold signal and each of the continually generated reference signals for generating a phase shifted timing pulse each time a reference signal coincides with the hold signal, whereby a clock pulse is generated in synchronism with a specific characteristic of each subsequent data pulse.

6. In an electronic digital system of the type including a rotatable magnetic memory having a timing track and at least one data track, a digital pulse read circuit comprising: an integrating circuit connected to continually receive pulse information from the timing track of the memory for continually generating integrated voltage signals at each timing pulse, a hold circuit responsive to the data track pulses being connected for receiving and holding the instantaneous voltage of the integrated voltage signal as a hold signal at the occurrence of a specific characteristic of a data track pulse; and voltage comparing means responsive to the hold voltage and each of the continually generated integrated voltage signals for generating a phase shifted timing pulse each time an integrated voltage signal exceeds the voltage of the hold signal whereby a clock pulse is generated in synchronism with a specific characteristic of each subsequent data pulse.

7. In an electronic digital system of the type including a rotatable magnetic storage drum having a timing track and at least one data track, a digital pulse read circuit comprising: an integrating circuit connected to continually receive pulse information from the timing track of the storage drum for continually generating an integrated voltage signal between each timing pulse; a hold circuit responsive to the data track pulses for receiving and holding the instantaneous voltage of the first integrated voltage signal as a hold signal at the occurrence of a specific characteristic of a data track pulse; and voltage comparing means responsive to the hold voltage and each of the continually generated integrated voltage signals for generating a timing pulse each time an integrated voltage signal exceeds the voltage of the hold signal whereby a clock pulse is generated in synchronism with a specific characteristic of each subsequent data pulse.

8. In an electronic digital system of the type including a rotatable magnetic storage drum having a timing track and at least one data track, a digital pulse read circuit comprising: an integrating circuit connected to continually receive pulse information from the timing track and the data track of the storage drum for continually generating an integrated voltage signal at each timing pulse upon the first coincidence between a timing track pulse and a data track pulse; a hold circuit responsive to the data track pulses for receiving and holding the instantaneous voltage of the integrated voltage signal as a hold signal at the occurrence of a specific characteristic of a data track pulse; and voltage comparing means responsive to the hold voltage and each of the continually generated integrated voltage signals for generating a timing pulse each time an integrated voltage signal exceeds the voltage of the hold signal whereby a clock pulse is generated in synchronism with a specific characteristic of each subsequent data pulse.

9. In an electronic digital system of the type including a rotatable magnetic storage drum having a timing track and at least one data track, a digital pulse read circuit comprising: an integrator circuit connected to continually receive pulse information from the timing track of the storage drum for continually generating an integrated voltage signal at each timing pulse; a hold circuit responsive to the data track pulses for receiving and holding the instantaneous voltage of the integrated voltage signal as a hold signal at the occurrence of a specific characteristic of a data track pulse and releasing the hold signal at the end of each data word; and voltage comparing means responsive to the hold voltage and each of the continually generated integrated voltage signals for generating a timing pulse each time an integrated voltage signal exceeds the voltage of the hold signal whereby a clock pulse is generated in synchronism with a specific characteristic of each subsequent data pulse.

10. In combination with a rotatable magnetic storage drum having a timing track, a sector track, and at least one data track, a circuit for synchronizing the timing pulses with the data pulses comprising: an integrating circuit connected to continually receive pulse information from the timing track, the sector track, and the data track of the storage drum for continually generating an integrated voltage signal after coincidence between a sector pulse and a data pulse during the time interval between each timing pulse; a hold circuit responsive to the data track pulses for receiving and holding the instantaneous voltage of the integrated voltage signal as a hold signal at the occurrence of a specific characteristic of a data track pulse; and voltage comparing means responsive to the hold voltage and each of the continually generated integrated voltage signals for generating a timing pulse each time an integrated voltage signal exceeds the voltage of the hold signal whereby a clock pulse is generated in synchronism with a specific characteristic of each subsequent data pulse.

11. In combination with a rotatable magnetic storage drum having a timing track, a sector track, and at least one data track, a circuit for synchronizing the timing pulses with the data pulses comprising: an integrating circuit connected to continually receive pulse information from the timing track, the sector track, and the data track of the storage drum for continually generating an integrated voltage signal after coincidence between a sector pulse and a data pulse during the time interval between each timing pulse; a hold circuit responsive to the data track pulses for receiving and holding the instantaneous voltage of the integrated voltage signal as a hold signal at the occurrence of a specific characteristic of a data track pulse and releasing the hold signal at the end of each data word; and voltage comparing means responsive to the hold voltage and each of the continually generated integrated voltage signals for generating a timing pulse each time an integrated voltage signal exceeds the voltage of the hold signal whereby a clock pulse is generated in synchronism with a specific characteristic of each subsequent data pulse.

12. In an electronic digital system of the type including a rotatable magnetic storage drum having a timing track and at least one data track, a digital pulse read circuit comprising: an integrater circuit connected to continually receive pulse information from the timing track of the storage drum for continually generating an integrated voltage signal at each timing pulse; a hold circuit including a capacitor and a diode switch, said capacitor being connected to receive and hold the instantaneous voltage of the integrated voltage signal at a hold signal, and said diode switch being operable to disconnect said capacitor from the integrated voltage signal at the occurrence of a specific characteristic of a data track pulse and being further responsive to an end-of-word signal for releasing the hold signal at the end of each data word; and voltage comparing means responsive to the hold voltage and each of the continually generated integrated voltage signals for generating a timing pulse each time an integrated voltage signal exceeds the voltage of the hold signal whereby a clock pulse is generated in synchronism with a specific characteristic of each subsequent data pulse.

13. In combination with a rotatable magnetic storage drum having a timing track, a sector track, and at least one data track, a circuit for synchronizing the timing pulses with the data pulses comprising: an integrator circuit including an RC integrator network and a discharge switch circuit connected to selectively discharge the RC network, said RC network being connected to receive pulse information from the timing track and the sector track of the storage drum for continually generating an integrated voltage signal after coincidence between a select sector pulse and a data pulse, said discharge switch being responsive to the clock pulses from the timing track for discharging the RC network during the duration of each clock pulse; a hold circuit responsive to the data track pulses for receiving and holding the instantaneous voltage of the integrated voltage signal as a hold signal at the occurrence of a specific characteristic of a data track pulse and releasing the hold signal at the end of each data word; and voltage comparing means responsive to the hold voltage and each of the continually generated integrated voltage signals for generating a timing pulse each time an integrated voltage signal exceeds the voltage of the hold signal whereby a clock pulse is generated in synchronism with a specific characteristic of each subsequent data pulse.

14. In an electronic digital system of the type including a rotatable magnetic storage drum having a timing track and at least one data track, a data pulse channel connected to detect pulse informtion from the data track, a digital pulse read circuit comprising: an integrating circuit connected to continually receive pulse information from the timing track of the storage drum for continually generating an integrated voltage signal at each timing pulse; a hold circuit responsive to the data track pulses for receiving and holding the instantaneous voltage of the integrated voltage signal as a hold signal at the occurrence of a specific characteristic of a data track pulse; and voltage comparing means responsive to the hold voltage and each of the continually generated integrated voltage signals for generating a timing pulse each time an integrated voltage signal exceeds the voltage of the hold signal whereby a clock pulse is generated in synchronism with a specific characteristic of each subsequent data pulse detected in the data channel.

15. In an electronic digital system of the type including a rotatable magnetic memory having a timing track and at least one data track, a digital pulse read circuit comprising: a tapped delay line circuit connected to continually receive pulse information from the timing track of the memory drum for continually generating a series of incrementally delayed pulse signals between each timing pulse; a hold circuit responsive to the data track pulses being connected for receiving and holding the instantaneous reference signal as a hold signal at the occurrence of a specific characteristic of a data track pulse; and signal comparing means responsive to the hold signal and each of the continually generated reference signals for generating a phase shifted timing pulse each time a reference signal coincides with the hold signal, whereby a clock pulse is generated in synchronism with a specific characteristic of each subsequent data pulse.

16. In an electronic digital system of the type including a rotatable magnetic memory having a timing track and at least one data track, a digital pulse read circuit comprising: a tapped delay line circuit connected to continually receive pulse information from the timing track of the memory drum for continually generating a series of incrementally delayed pulse signals between adjacent timing pulses; a counter circuit response to the data track pulses being connected for receiving and holding the instantaneous pulse count as a hold signal at the occurrence of a specific characteristic of a data track pulse; and signal comparing means responsive to the hold signal and each of the continually generated reference signals for generating a phase shifted timing pulse each time a reference signal coincides with the hold signal, whereby a clock pulse is generated in synchronism with a specific characteristic of each subsequent data pulse.

17. In an electronic digital system of the type including a rotatable magnetic memory having a timing track and at least one data track, a digital pulse read circuit comprising: a tapped delay line circuit connected to continually receive pulse information from the timing track of the memory drum for continually generating a series of incrementally delayed pulse signals between each timing pulse; a counter circuit response to the data track pulses being connected for receiving and holding the instantaneous pulse count as a hold signal at the occurrence of a specific characteristic of a data track pulse; and gate means responsive to the hold signal and each of the continually generated reference signals for generating a phase shifted timing pulse each time a reference signal coincides with the hold signal, whereby a clock pulse is generated in synchronism with a specific characteristic of each subsequent data pulse.

18. In an electronic digital system of the type including a rotatable magnetic memory having a timing track, a sector signal track, and at least one data track, a digital pulse read circuit comprising: a tapped delay line circuit connected to continually receive pulse information from the timing track of the memory drum for continually generating a series of incrementally delayed pulse signals between each timing pulse; a counter circuit response to the data track pulses being connected for receiving and holding the instantaneous pulse count as a hold signal at the occurrence of a specific characteristic of a data track pulse; gate means responsive to the hold signal and each of the continually generated reference signals for generating a phase shifted timing pulse each time a reference signal coincides with the hold signal, whereby a clock pulse is generated in syncrhronism with a specific characteristic of each subsequent data pulse; and a control circuit responsive to the signals from the sector track and the signals from the data track being connected to enable said counter circuit during the time interval between the first clock pulse occurrence and the occurrence of a specific characteristic of the data track pulse, to inhibit said counter circuit thereafter to the end of the sector signal, and to clear said counter at the end of the sector signal.

References Cited

UNITED STATES PATENTS

| | | | |
|---|---|---|---|
| 2,700,755 | 1/1955 | Burkhart | 340—174.1 |
| 2,839,615 | 6/1958 | Sarratt | 340—174.1 |
| 2,972,735 | 2/1961 | Fuller et al. | 340—174.1 |
| 2,994,857 | 8/1961 | Giel | 340—174.1 |
| 3,196,420 | 7/1965 | Francois | 340—174.1 |

BERNARD KONICK, *Primary Examiner.*

V. P. CANNEY, *Assistant Examiner.*